Oct. 4, 1955 G. A. TINNERMAN 2,719,558
SHEET METAL NUT WITH RETAINER MEANS
Filed Oct. 2, 1951

INVENTOR
GEORGE A. TINNERMAN
BY
H. G. Lombard
ATTORNEY

United States Patent Office 2,719,558
Patented Oct. 4, 1955

2,719,558

SHEET METAL NUT WITH RETAINER MEANS

George A. Tinnerman, Cleveland, Ohio, assignor to Tinnerman Products, Inc., Cleveland, Ohio, a corporation of Ohio Application October 2, 1951, Serial No. 249,365

1 Claim. (Cl. 151—41.75)

This invention relates to attachable types of fasteners adapted for ready attachment to an apertured supporting part to provide the same with means for securing a cooperating part thereto or for securing another part, object or article of manufacture to said supporting part. The invention is directed, more particularly to fasteners which comprise clip means for attaching the fastener in a single, relatively small opening in a supporting part together with means for threadedly engaging a bolt or screw fastener to secure a cooperating part to the supporting part, or other means for retaining an object or part in secured relation to the supporting part.

In many assemblies, the nature of the installation is such that only a single, relatively small assembling opening or recess in a part to be secured is permissible or advisable to attach a nut or other type of fastener for securing the parts of the installation. The most desirable attachment of a fastener in such instances is one in which the complete attachment is effected in a single hole serving both as a bolt passage and an attaching opening in a manner which minimizes the attaching elements required on the fastener and which dispenses with the requirement for a separate hole or holes in the supporting part for attaching the fastener or for applying auxiliary attaching means such as rivets, screws, welding, and the like, to retain the fastener in attached position.

A primary object of the invention is to provide a simplified and inexpensive fastener of this character which comprises a nut device combined with a clip type of attaching means, and which is applied to an opening in a wall or panel by an operation taking place entirely from the outer or forward side thereof to attach the nut device in fastening position at the rearward side of the wall or panel. The use of such a fastener is necessary and desirable in many constructions as the means for attaching or mounting an object or article to be secured onto a supporting wall or panel which is not conveniently or readily accessible at the rearward side thereof to complete the mounting or installation. In addition, the arrangement is such that the improved fastener of the invention provides a mounting for an article which combines the strength and durability of a bolt and nut fastening device with the speed and facility of attachment provided by the clip type of attaching means of the fastener.

The invention, otherwise, involves an improved fastener in the form of an attachable type of nut device of general utility which is adapted for a wide range and variety of of applications and uses in what are known as blind locations wherein only one side of a part to be secured is conveniently or readily accessible for the application of fastening means for securing such part to another part of an installation. In this regard, another primary object of the invention is to provide an improved fastener, such as described, of relatively high strength and durability by reason of the construction thereof in the form of a generally channel-shaped body comprising side flanges which serve to bolster and reinforce the base of the fastener and the nut elements carried by said base for engaging the bolt or screw to be used with the fastener.

A further object of the invention is to provide a fastener of the kind described having an improved attaching means in the form of an S-shaped retaining arm adapted to cooperate with the side flanges of the fastener body to hold the fastener in self-retained fastening position over a combined bolt passage and assembling or attaching opening in a part at the rearward side of such part incidental to an assembling operation taking place entirely from the forward or outer side of the supporting part.

An additional object of the invention is to provide a fastener of this character having locking detents on the side flanges of the fastener adapted to cooperate with the S-shaped arm, or the like, in engagement with edge portions of the attaching opening to lock the fastener in applied position and prevent retrograde and rotative movement and inadvertent disconnection or displacement thereof from such applied fastening position.

Further objects and advantages, and other new and useful features in the construction, arrangement and general combination of elements of the invention will be readily apparent as the following description proceeds with reference to the accompanying drawings for purposes of illustration but not of limitation, in which like reference characters designate like parts throughout, and in which:

Fig. 1 is a vertical sectional view through the wall of a refrigerator, for example, in which the inner panel or liner is accessible from one side only for the application and attachment of fastening means, and shows the attachable nut device, or the like, of the invention in side elevation as initially applied through a combined bolt passage and attaching opening in the panel or liner from the accessible side thereof;

Figure 2:
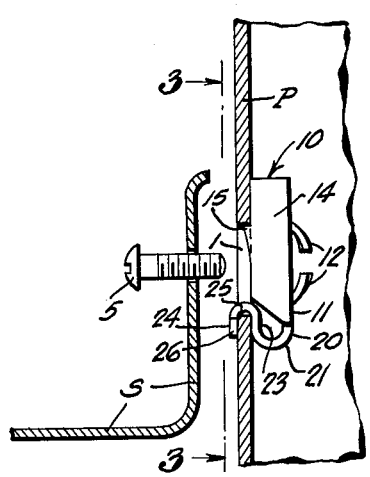
Fig. 2 is a similar view showing the fastener in fully attached position in the opening in the panel or liner and with the cooperating bolt or screw in position to be applied thereto to mount a shelf support or other part.
Figure 1:
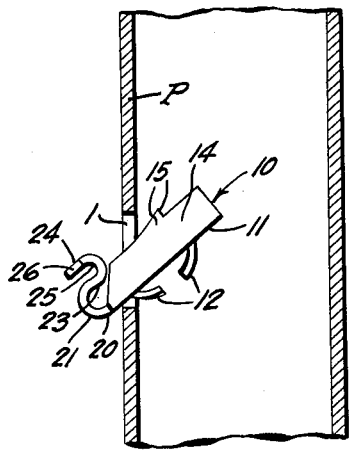

Referring now, more particularly, to the drawings, Figs. 1 and 2 illustrate a typical assembly in which a fastener 10, in accordance with the invention, is attached in a combined bolt passage and assembling opening 1 in a panel P defining the inner panel or liner of a refrigerator preparatory to the mounting of a shelf S, or the like, by means of a bolt or screw 5 applied to said fastener 10. The invention is particularly suited for use in the manufacture of refrigerators for mounting tray rack guides, adjustable shelf racks, crisper cover guides, etc., to the inner liner of a refrigerator, but, of couse, such a panel P may be a fragment of any similar member to which it is desired to attach or mount a similar object such as a knob or handle, or the like, for example, in accordance with the invention.

Figure 3:
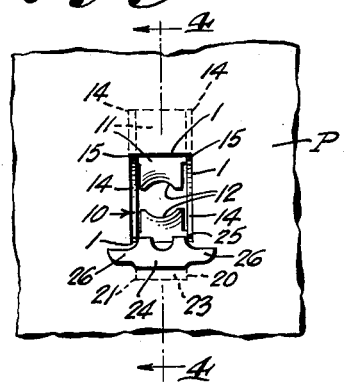
Fig. 3 is an elevational view of a fragment of the inner panel of Fig. 2 as seen along line 3—3, looking in the direction of the arrows.
Figure 5:
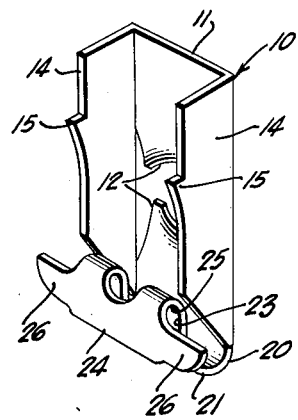
Fig. 5 is a perspective view of the fastener per se.

In the present example, the shelf S is shown provided with a bolt receiving opening for a bolt or screw 5 which is applied to the fastener 10 previously attached in the assembling opening 1 in the panel or casing P. The shelf S is supported by a suitable member of such bolts or screws 5 secured by such fasteners 10 attached in individual holes or openings provided in the inner panel or liner P of the refrigerator along the path in which the shelf S is to be supported in a completed installation. The assembling openings 1 are usually punched in the panel P constituting the refrigerator liner or other part prior to the assembly thereof in a completed structure whereupon said openings 1 become accessible from one side only; and it is this condition which makes it essential that the securing means for mounting a shelf or other part be capable of installation to a completed mounting by an operation taking place entirely from the outer or accessible side of the panel P. In the present example, the assembling openings 1 are shown provided in a generally rectangular configuration, Fig. 3, but, of course, such an opening may be provided in a square, circular or other selected design as may be necessary or desirable. Any such opening 1, serves both as assembling opening for attaching the fastener 10 and as a passage for the bolt or screw 5 applied thereto.

The fastener, designated generally 10, is formed from a relatively small, inexpensive blank of sheet metal which is best provided in the manner of a simple section severed from standard sheet metal strip stock with a minimum loss or waste of material. Any suitable sheet metal may be employed but preferably that of a spring metal nature such as spring steel or cold rolled steel having spring characteristics and otherwise of a much greater tensile and compressive strength than the supporting part P to which the fastener is attached. The sheet metal blank for forming the fastener is so designed as to define a generally channel-shaped body comprising a substantially rectangular base 11 which is provided with suitable bolt or screw engaging means 12 together with a pair of similar side flanges 14 projecting from the underside of said fastener base 11. The generally channel-shaped fastener body, thus provided, has a length materially greater than the length of the assembling opening 1, while the width of the fastener body between the side flanges 13, is slightly less than the width of the assembling opening 1 so that the fastener body is adapted to pass through said assembling opening from one side of the panel P to the opposite side thereof.

The base portion 11 is provided with integral bolt or screw engaging means in the form of cooperating tongues 12 or the like, which are pressed, extruded, or otherwise struck and formed to project upwardly out of the plane of the base 11 for threadedly engaging a bolt or screw substantially in the manner of a nut. Preferably the tongues 12 are so formed in the stamping operation as to extend upwardly in substantially ogee formation with the extremities thereof so spaced as to lie on a helix corresponding substantially to the pitch of the thread on the bolt or screw fastener 5 for uniform threaded engagement therewith in the most effective manner.

The thread engaging elements 12 are best provided in the sheet metal base 11 by an aperture intermediate spaced parallel slits which form cooperating tongues, or the like, having spaced extremities defining the desired thread or thread opening corresponding substantially to the root of the bolt or screw for threadedly engaging the thread thereof. Said tongues 12 otherwise are preferably formed to project upwardly out of the plane of the fastener base and are bent lengthwise in substantial ogee formation to provide for the maximum strength obtainable to withstand the tightening action of the bolt or screw 5 as it is advanced to final applied fastening position.

Such thread engaging means 12 may be pressed, stamped, extruded, or otherwise provided in any suitable form or construction so long as the same threadedly engage with the thread of the bolt or screw 5 and, in this relation, the present invention fully contemplates the provision of such thread engaging means in various other similar and related forms, as in the manner of a keyhole type of thread opening, or a perforated protuberance which is pressed from the sheet metal base 11 and shaped to provide a helical thread or thread opening, or otherwise has the walls thereof tapped to provide a plurality of threads for threadedly engaging the bolt or screw. It has been found that such thread engaging means prepared in the form of cooperating, yieldable tongues 12 as shown, are most efficient and practical in that they are possessed of unusual inherent strength and will not collapse or pull through when the bolt or screw is tightened, nor loosen under continuous strain and vibration in the installation. This takes place by reason of the fact that the sheet metal material of the base 11 from which such tongues 12 are formed is of less thickness than the pitch or spacing between adjacent thread convolutions on the bolt or screw, wherefore the extremities of said tongues tend, more effectively, to move toward each other and dig into the grooves intermediate adjacent thread convolutions when the bolt or screw is tightened and otherwise become embedded in the root of the bolt or screw in locked, frictional fastening engagement therewith.

Thus, in the present example, the tongues 12 are shown as extending outwardly out of the plane of the fastener base 11 in a substantially ogee design and provided preferably with notched extremities, defining substantial biting jaws adapted to cut into the root of the bolt and the adjacent thread surfaces thereon in positive locking relation therewith in the most effective manner. There is thereby eliminated the necessity for a separate, auxiliary locking means such as a lock nut or lock washer and this, in mass production methods of assembly makes possible considerable savings not only in the cost of such locking devices, but also, in the expense and labor involved in assembling operations and other added steps in manufacture which such auxiliary locking means require. It is to be understood, however, that the present invention is not limited in any manner or form to the illustrated construction of the thread engaging means 12 but rather, comprehends also, various other similar and related forms of such tongues or equivalent thread engaging elements.

The body of the fastener 10, as provided in a generally channel-shaped form, necessarily has a relatively strong and rigid construction by reason of the side flanges 14 which bolster and reinforce the intermediate fastener base 11 against strain and bending forces set up in the tightening of the bolt or screw applied to the fastener, and in the load placed upon the bolt or screw 5 and the shelf S or other part secured thereby. The generally channel-shaped construction of the fastener 10 otherwise is such that the width thereof need be only slightly greater than the tongues 12 themselves whereby the fastener is advantageously adapted to be made in relatively small sizes for use in close quarters and small assemblies.

The lower edges of the side flanges 14 of the fastener are so cut as to define longitudinally extending elongate projections or detents 15 which are suitably spaced from the forward end of the fastener body as necessary to be received within the assembling opening 1 in engagement with the marginal edge of one end of said opening 1 and in abutting relation to the adjacent side edges of said opening to retain the fastener against relative rotation and shifting or displacement either longitudinally or laterally of said opening.

Figure 4:
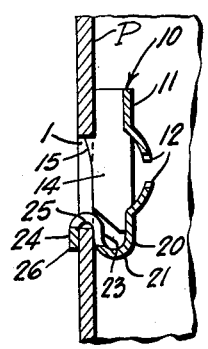
Fig. 4 is a sectional view of Fig. 3 along line 4—4.

The opposite or trailing end of the fastener 10 includes an extension of the fastener base 11 which is bent into a generally S-shaped arm 20 projecting from the underside of the fastener. The S-shaped arm includes a portion 21 which preferably is of a width slightly less than the width of the panel opening 1 and depends directly from the fastener base 11 between the side flanges 14 and terminates in an outwardly projecting hook or clip portion comprising a pair of spaced gripping elements or jaws 23 and 24, with the space between said jaws being open outwardly of the fastener as necessary for the adjacent marginal edge of the opening 1 to be received between said spaced jaws 23 and 24, as seen in Figs. 2 and 4. Such a clip portion comprising the pair of spaced gripping elements or jaws 23, 24, may be formed in various ways but preferably is provided by bending the end of the extension 20 inwardly under the fastener base 11 to provide the jaw 23 for engaging the inner surface of the panel P adjacent the panel opening 1, and thence outwardly in a return bend defining the cooperating jaw 24 for engaging the outer surface of said panel P in cooperation with said jaw 23. The spaced jaws 23, 24, have a spacing slightly less than the thickness of the marginal edge portion of the opening 1 engaged thereby, so as to clasp such marginal edge portion frictionally and grippingly under spring tension.

The bight of the return bend forming the spaced jaws 23, 24, defines a shoulder 25 adapted to seat in abutting relation with the adjacent marginal edge of the opening 1 in cooperation with said jaws 23, 24, in gripping engagement with the opposite surfaces of such marginal edge portion. The shoulder 25 is spaced from the detents 15 on the side flanges 14 a distance approximating the space between the edges of the opposite ends of the opening 1 engaged thereby such that the fastener is adapted to be fixedly and rigidly retained in attached position in said opening 1 against longitudinal shifting or displacement.

The gripping element or jaw 24 which engages the outer surface of panel P adjacent the opening 1 is provided with laterally outwardly projecting enlargements or wings 26 of such size as to extend materially beyond the side edges of the opening 1 in a manner to prevent the fastener from passing completely through said opening 1 in the application thereof to attached position, as presently to be described. The wings or enlargements 26 otherwise serve as bearing surfaces cooperating with the jaw 24 in engaging the outer surface of the panel P to rigidify the attachment of the fastener in the panel opening 1 against axial displacement from said opening in the application of the bolt or screw 5 to the attached fastener 10.

The fastener 10, thus provided, is easily and quickly applied to attached position in the opening 1 by an operation taking place entirely from the outer, forward, or readily accessible side of said panel P to locate the fastener body 11 in fastening position at the rearward side of said panel P. As seen in Fig. 1, the forward end of the fastener is inserted through the opening 1 to the rearward side of the panel P until limited by the enlargements 26 engaging the outer side of said panel P. In this position, the body 11 of the fastener is completely at the rear of the panel P together with the arm portion 21 except for the jaw 24 and enlargements 26 at the forward side of said panel. By pressing or otherwise manipulating the jaw 24 to move said jaw and the adjoining enlargements 26 to a position flush with or parallel to the outer surface of said panel P, the body 11 of the fastener is caused to swing around to substantially parallel relation with the inner side of said panel P; and in this position, the space between the spaced jaws 23, 24, becomes aligned with the marginal edge portion of the adjacent end of the opening 1. A suitable pointed tool, such as a screw driver, is then pressed against the outer surface of the return bend defining the shoulder 25 to force the jaws 23, 24, to spread apart as necessary to move into frictional and gripping clasping engagement with the adjacent marginal end portion of the panel opening to the position in which the shoulder 25 between said jaws 23, 24, is in abutting relation to the end edge of said opening 1, as seen in Figs. 2 and 4. In this position, the elongate detents 15 snap into the opposite end of the opening 1 to lock the fastener in attached position inasmuch as said detents are provided in a predetermined spacing from the shoulder 25 for this purpose.

Accordingly, in the fully attached position of the fastener 10, the jaws 23 and 24 cooperate in clasping, gripping engagement with the inner and outer surfaces, respectively, of the panel P at one end of the opening 1, while the detents 15 are disposed in abutting relation to the opposite end edge of said opening 1 to lock the fastener in attached position therein against longitudinal shifting or displacement. At the same time, the sides of the elongate detents 15 are disposed in abutting relation to the side edges of the panel opening 1, to retain the fastener fixedly against rotation relative to the panel P and against both lateral as well as longitudinal shifting or displacement in the opening 1, as aforesaid. This is important upon insertion and turning of the bolt or screw fastening 5, Fig. 2, to threaded fastening engagement with the stud engaging elements 12 in securing the shelf S or other part to the supporting part P in completing any installation. In a blind assembly, such substantially fixed, nonrotative attachment of the fastener in self retained position on the supporting part is essential inasmuch as the rearward side of the supporting structure is not readily accessible and it becomes impossible or inconvenient for the operator to hold the fastener while inserting and threadedly engaging a bolt or screw with the thread engaging means thereof. In any case, the cooperating elongate detents 15 are located to correspond with the contour of the opening 1 to engage the wall thereof at spaced points and thereby lock the fastener rigidly and nonrotatively in attached position, as aforesaid. It is thereupon a simple matter to complete an installation securing the shelf S or other part to the supporting part P by applying the bolt or screw 5 into threaded engagement with the thread engaging means 12 on the fastener base 11.

It will be appreciated that in the use of the simplified, one-piece fastener of the invention, the fasteners are admirably suited for attachment in relatively small openings in close quarters. Also, various fastening installations may be provided which are relatively light in weight and superior and more advantageous in many respects than those secured by clinch-on nut devices embodying conventional threaded nuts which require not only lock washers to provide a locked assembly, but also some extraneous means such as spot welding, riveting or cage devices to retain the nuts in applied position on the support preparatory to the application of the bolt or screw fastening thereto.

The fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap but effective fastener may be provided from cold rolled metal, such as cold rolled steel, which is untempered but of a spring metal nature and capable of providing an effective and reliable fastener in accordance with the invention.

While the invention has been described in detail with a specific example, such example is intended as an illustration only inasmuch as various changes in the construction and arrangement of the elements of the fasteners may be provided without departing from the spirit and scope of the invention.

What is claimed is:

A fastener comprising a generally channel-shaped sheet metal body defining a base provided with a bolt or screw receiving opening and thread engaging means formed from marginal portions of said opening for threadedly engaging said bolt or screw, spaced side flanges extending from the underside of said base and strengthening and reinforcing said base and thread engaging means thereon, said fastener having a forward end adapted to be applied through a panel opening from one side of the panel to locate said base and thread engaging means thereon in fastening position over said panel opening at the opposite side of said panel with the lower edges of said spaced side flanges bearing on said opposite side of the panel adjacent said panel opening to strengthen and reinforce said base and thread engaging means thereon in said fastening position of the fastener, the other end of said fastener carrying a substantially S-shaped arm integral with said base and extending from the underside of said base between said spaced side flanges, said substantially S-shaped arm comprising an outwardly curved portion of said arm adjoining said base extending into an inner flat-type gripping element in substantially parallel and spaced relation to the underside of said base and in a plane substantially in line with said lower edges of said spaced side flanges, said inner flat-type gripping element merging with a return bent portion of said arm extending outwardly in substantially parallel relation to the underside of said base and providing an outer flat-type gripping element on the free end of said substantially S-shaped arm and in spaced directly opposite face to face relation with said inner flat-type gripping element, said substantially S-shaped arm including said outwardly curved portion thereof adjoining said base and said outer flat-type gripping element on the free end thereof lying completely beyond the adjacent ends of said spaced side flanges and providing an attaching means free and independent from said spaced side flanges, said spaced inner and outer flat-type gripping elements being adapted to cooperate in gripping opposite surfaces of said panel adjacent said panel opening to attach the fastener in said fastening position, said outer flat-type gripping element having lateral wings of such size as to project materially beyond said spaced side flanges and said base of the fastener and beyond said panel opening to prevent the fastener from passing completely through said panel opening in the application of the fastener, and detents on said spaced side flanges receivable in said panel opening to retain said inner and outer flat-type gripping elements in the attached fastening position of the fastener.

References Cited in the file of this patent
UNITED STATES PATENTS

| | | |
|---|---|---|
| 991,447 | Kennedy | May 2, 1911 |
| 2,275,773 | Kost | Mar. 10, 1942 |
| 2,302,389 | Kost | Nov. 17, 1942 |
| 2,612,927 | Aylor | Oct. 7, 1952 |